United States Patent [19]
Lynch

[11] Patent Number: 5,447,395
[45] Date of Patent: Sep. 5, 1995

[54] ANGULAR OFFSET CHAMFER TOOL

[76] Inventor: John S. Lynch, 15 Crescent La., New Milford, Conn. 06776

[21] Appl. No.: 40,020

[22] Filed: Mar. 30, 1993

[51] Int. Cl.$^6$ ............................................. B23P 15/28
[52] U.S. Cl. ...................................... 407/77; 407/85; 407/33; 407/87; 407/92; 407/97
[58] Field of Search ..................... 407/77, 85, 86, 87, 407/92, 97, 33, 36–40, 42, 44–47

[56] References Cited

U.S. PATENT DOCUMENTS

| | | | |
|---|---|---|---|
| 2,160,369 | 5/1939 | Rikof | 407/85 |
| 2,541,719 | 2/1951 | Proksa | 407/92 |

FOREIGN PATENT DOCUMENTS

| | | | |
|---|---|---|---|
| 0012980 | 2/1910 | Germany | 407/87 |

OTHER PUBLICATIONS

Computer Simulation . . . Ultra high-speed Grindigh; Ohmura, et al. JSPE; Aug. 1993.

Speed-stroke Grinding of Advanced Ceramics; Inasaki Annals of the Cirp, vol. 37/1/1988.

*Primary Examiner*—Bruce M. Kisliuk
*Assistant Examiner*—Eileen P. Morgan
*Attorney, Agent, or Firm*—Richard C. Litman

[57] ABSTRACT

A chamfering tool made up of a holder and a double headed blade. The holder is substantially cylindrical, with a bullet nose at one end and a turned down shank at the other end. An angularly offset bore for holding the blade penetrates the bullet nose at an angle to the holder longitudinal axis, and also penetrates the holder cylindrical wall. When the blade is installed in the bore, one or both heads externally expose their respective operating cutting edges. The blade is substantially cylindrical, with cutting edges at each end being perpendicular to and intersecting the longitudinal axis of the blade. The novel arrangement enables the chamfering tool to work in tight quarters, to be readily removed and easily sharpened, and enables both right and left handed cutting by a simple adjustment.

6 Claims, 4 Drawing Sheets

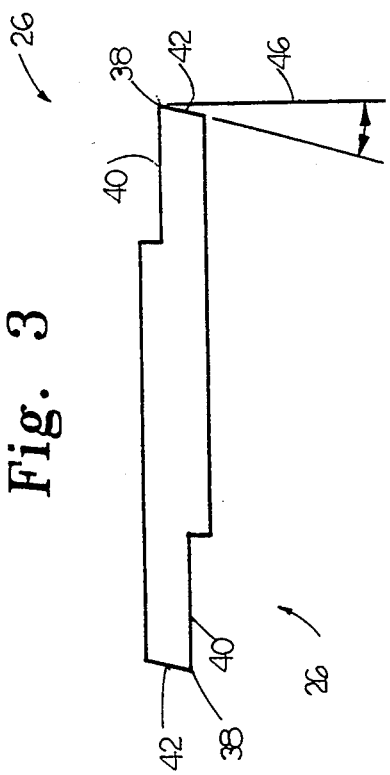
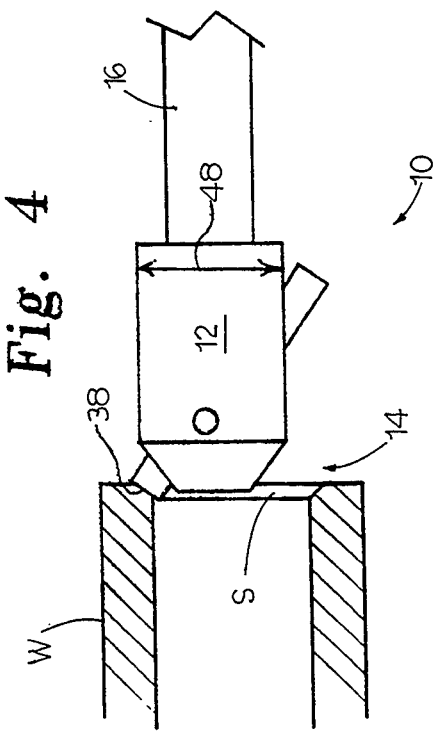
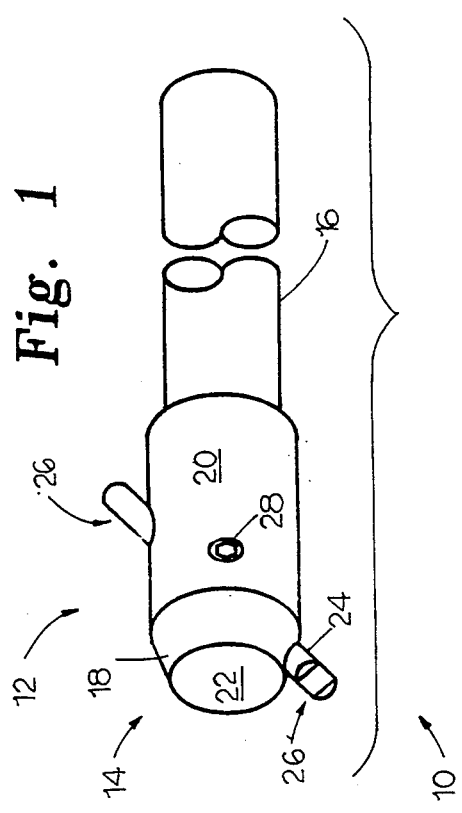
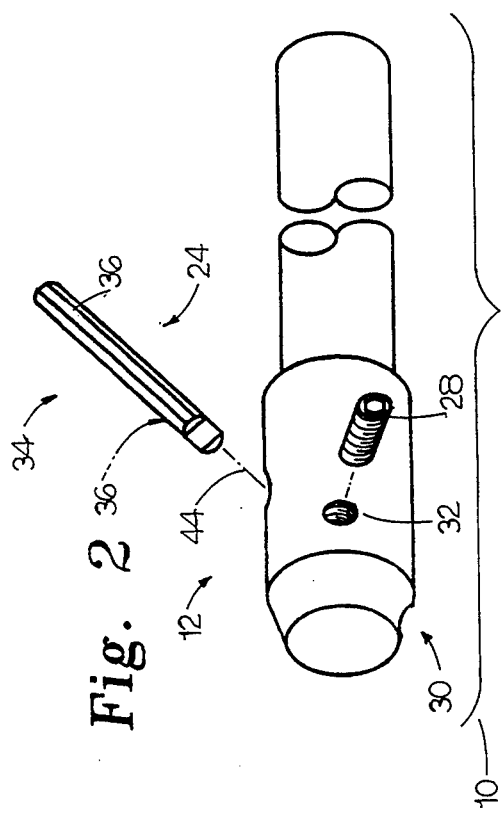

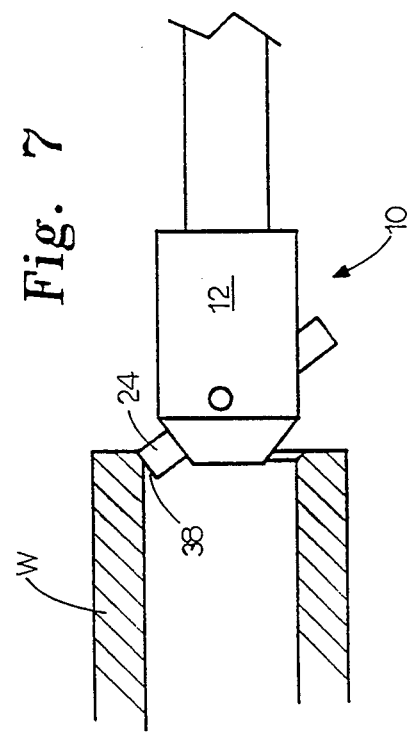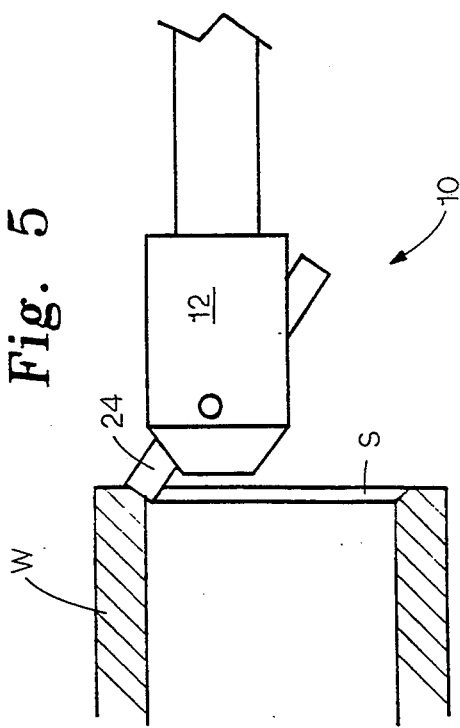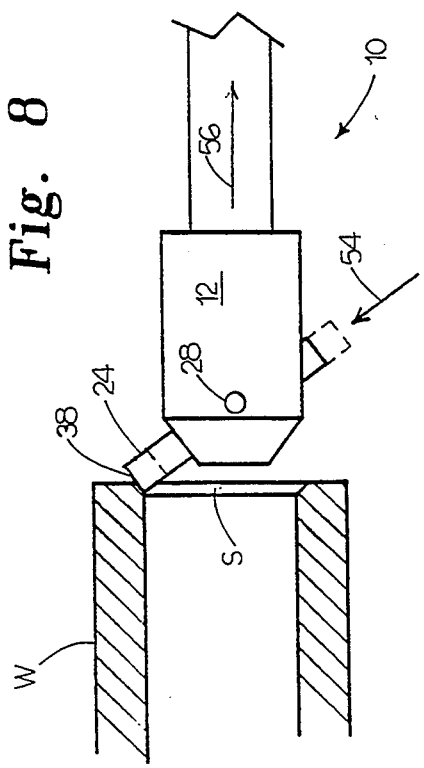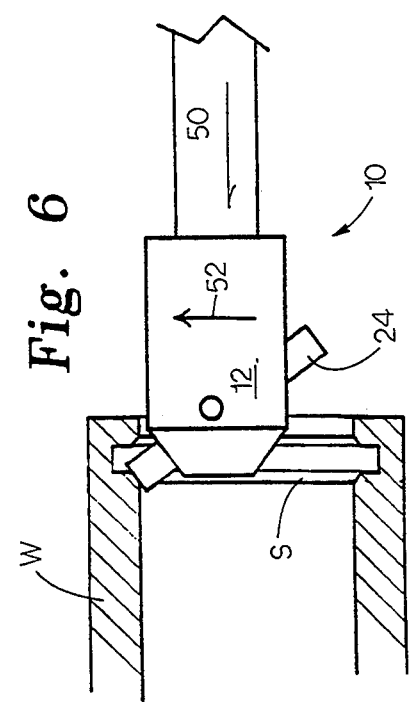

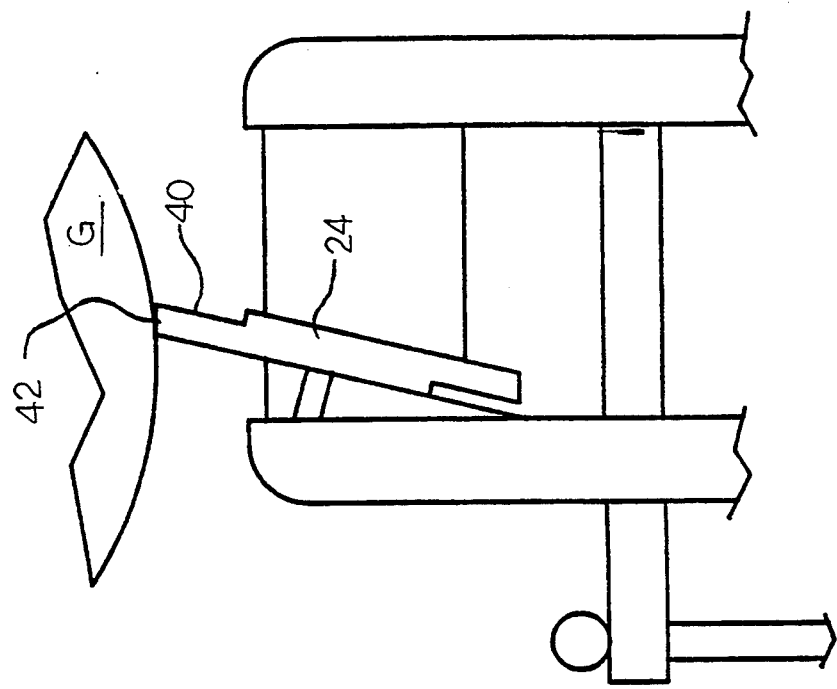
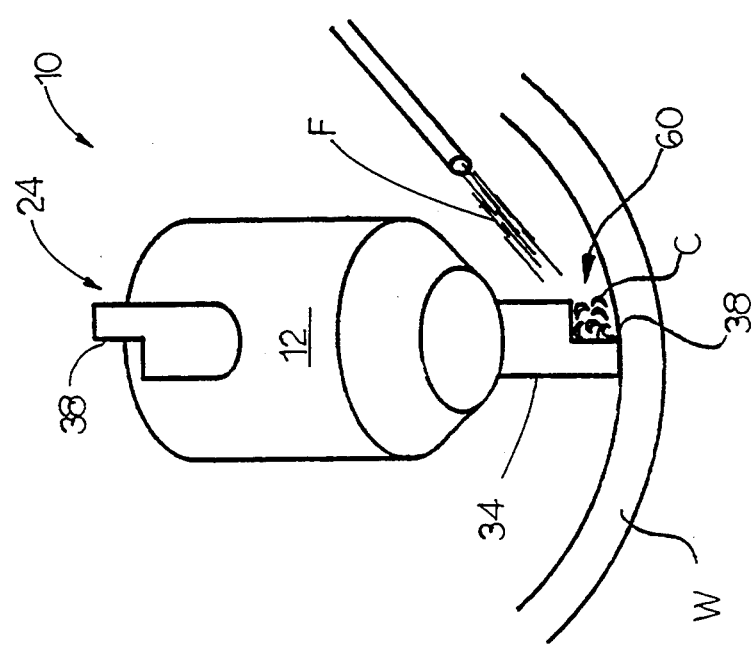

ANGULAR OFFSET CHAMFER TOOL

FIELD OF THE INVENTION

The present invention relates to a chamfer tool, and more particularly to a chamfering blade and its associated holder, as used in a turret type machine or the like.

DESCRIPTION OF THE PRIOR ART

Boring tools comprising a holder and a cutting element angularly disposed therewithin are exemplified in U.S. Pat. Nos. 2,551,948 and 4,227,841, issued respectively to William S. Hutchinson on May 8, 1951, and to Donald L. Hoover on Oct. 14, 1980. The cutting element of Hutchinson's tool sits in a cooperating bore open at a forward face thereof. Hoover's cutting element is held against an angularly oriented forward face of a boring bar by a yoke held under tension to the boring bar body. Both cutting elements form a cutting edge defined at the pointed juncture of two or more machined faces.

Further examples are seen in German, Italian, Russian, and U.K. Pat. Document Nos. 1,117,970; 548,591; 332,948; and 816,751, respectively. However, none of these examples show the advantageous arrangement of the cutting element surfaces, nor of egress of the cutting element from an oblique face of the holder body, while extending outside the cylindrical external surface of a generally cylindrical holder.

U.S. Pat. No. 4,619,564, issued to Mark E. Jacobson on Oct. 28, 1986, discloses a cutting element including an incuse surface. However, orientation of Jacobson's cutting element within its associated holder is different from that of the present invention.

A cutting tool adjustable for left and right hand operation is shown in U.S. Pat. No. 945,674, issued to George A. Barnes on Jan. 4, 1910.

A cutting element having cutting edges on opposing sides is disclosed in U.S. Pat. No. 455,391, issued to Ulrich Eberhardt on Jul. 7, 1891.

None of the above inventions and patents, taken either singly or in combination, is seen to describe the instant invention as claimed.

SUMMARY OF THE INVENTION

The present invention provides a cutting tool uniquely suitable for internal and external chamfering. Unlike boring and like operations, chamfering may require working at very close quarters, and access to an incuse or partially concealed portion of the workpiece. The novel tool also simplifies resharpening and set up procedures.

A holder having a substantially cylindrical body including a partially conical profile has a bore angularly oriented to the body and which penetrates a conical forward surface of the holder. While the preferred configuration of the holder is partially conical, the forward surface could be made hemispherical, or otherwise configured to similar effect. Hereinafter, all possible configurations achieving a blunt, compact profile including a surface neither parallel nor perpendicular to the holder longitudinal axis will be referred to collectively as "bullet nosed" for convenience.

A cutting element having oppositely oriented cutting edges at each end of the cutting element fits closely within this bore, and is secured therewithin by a setscrew.

The cutting element has cutting edges formed in both ends. Either end of the cutting element may be used for cutting as it protrudes either forwardly or rearwardly from the holder. The cutting element is bilaterally symmetrical about any longitudinal plane and about a central radial plane.

The cutting edge of each end is formed at the juncture of two faces, a first face lying in a plane longitudinally bisecting the cutting element. The cutting edge is perpendicular with respect to the cutting element longitudinal axis. An incuse profile, or recess, is thus defined in the cutting element, which recess enables gathering of cuttings and access of cutting fluid to the cutting edge while operating. Sharpening is accomplished by grinding only the face disposed at an angle to the longitudinal face, and may be sharpened with a general purpose rotary grinding wheel, rather than by a special tool. Also, since only one face need be ground for sharpening, the cutter lasts longer since material is removed from only one face.

This arrangement enables the cutting element to be rotated to accommodate both right and left hand rotation. Backwardly and forwardly internal and external cuts may be made to a workpiece. The perpendicular orientation of the cutting edge with respect to the cutting element longitudinal axis obviates necessity of centering the blade when setting up work.

Accordingly, it is a principal object of the invention to provide a chamfering tool which enables both right and left hand operation.

it is another object of the invention to provide a chamfering tool having a removable cutting element which need not be centered when being installed in the holder.

it is a further object of the invention to provide a chamfering tool having a cutting element which defines a cutting edge between a first face lying in a longitudinal plane and a second face oriented at an angle to the first face.

It is yet a further object of the invention to provide a chamfering tool having a cutting element wherein a cutting edge is oriented perpendicular to the cutting element longitudinal axis.

An additional object of the invention is to provide a chamfering tool having a cutting element for which sharpening requires grinding of only one surface.

Still another object of the invention is to provide chamfering tool having a cutting element which can be sharpened by a general purpose grinder.

Yet a further object of the invention is to provide a chamfering tool which is readily adjusted for different chamfering diameters.

Still a further object of the invention is to provide a chamfering tool having a cutting element including cutting edges at two ends thereof.

A still additional object of the invention is to provide a chamfering tool having a cutting element which can be repositioned to even out wear across a single cutting edge.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1 is a perspective view of the novel chamfering tool.

FIG. 2 is a perspective, exploded view of the novel chamfering tool.

FIG. 3 is a side elevational detail view of the cutting element.

FIG. 4–9 are side elevational environmental views of the novel chamfering tool engaging a workpiece, shown partially in cross section.

FIG. 14 is a frontal, environmental, perspective view of the novel chamfering tool engaging a workpiece.

FIG. 15 is an environmental, side elevational view of the cutting element while being sharpened, shown partially in cross section.

Similar reference characters denote corresponding features consistently throughout the attached drawings.

DETAILED DESCRIPTION OF THE PREFERRED EMBODIMENT

Figure 11:
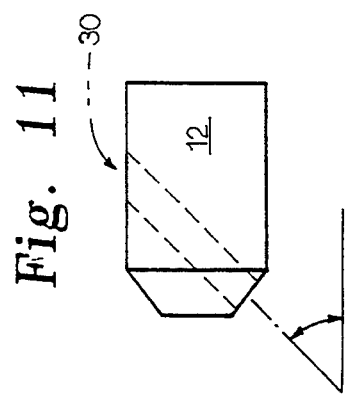
FIGS. 11–13 are side elevational diagrammatic views of the holder showing alternative embodiments, wherein three industry standard included angles are shown.

The chamfer tool 10 of the present invention is seen in FIG. 1 to comprise an elongated holder 12 having a bullet nose 14 and a cylindrical shank 16. In this context, "bullet nose" signifies a configuration including a tapered surface 18 which forms an angle with respect to a lateral outer surface 20 of holder 12. Tapered surface 18 may be conical or frustoconical, or may assume any curve, or may include flat facets, or still other configurations, provided that it defines a gradual transition from a full diameter of holder 12 to an end thereof. Configuration of the endmost surface 22 of bullet nose 14, which configuration is circular and flat in the depiction shown throughout the included Drawings, is not material; the significance lies in tapered surface 18.

A cutting element 24 having two working heads 26,2G protrudes through holder 12, exiting therethrough at surface 18 and at a point along lateral outer surface 20 of holder 12. A setscrew 28 securely retains cutting element 24 to holder 12.

Referring to FIG. 2, holder 12 is shown to have an angularly offset bore 30 for holding cutting element 24 in a close fit therein. A threaded locking bore 32 intersects offset bore 30 such that setscrew 28 can be tightened against cutting element 24.

Cutting element 24 is seen to have an elongated body 34 which preferably corresponds in cross section to the offset bore 30 so as to assure a close, interference free fit therebetween. A flat surface 3G is provided on each side of body 34, diametrically opposed thereon, to enable setscrew 28 to pin cutting element 24 within offset bore 30, preventing rotation therebetween.

Turning now to FIG. 3, it will be seen that each working head 26 includes a cutting edge 38 defined at the juncture of faces 40 and 42. It will be seen that face 40 lies in a plane including a cutter longitudinal axis 44 (seen in FIG. 2). This is an important Feature, since, in most machine tools (not shown) with which chamfering tool 10 is usable, a workpiece is rotatingly held, and a chamfering tool does not rotate, but is fed axially forwardly and backwardly. Such machine tools may rotate a workpiece clockwise or counterclockwise, and the novel chamfering tool 10 is adjustable For operation in both directions. This adjustment is made by rotating cutting element 24 180 degrees around its longitudinal axis 44. Face 42 intersects face 40 at a line perpendicular to cutter longitudinal axis 44. Thus, cutting edge 38 is also perpendicular to axis 44. Preferably, a ten degree angle is formed between face 42 and a reference plane perpendicular to face 40 (the reference plane is seen as line 46 in FIG. 3).

It is preferred that working heads 26,26 be oriented oppositely, i.e., respective faces 40 being coplanar, but facing opposite directions. This arrangement enables different chamfering operations to be performed without adjusting cutting element 24 within holder 12, as will be further explained hereinafter. When cutting element 24 is so arranged, it will be seen that faces 40,40 are parallel. Accordingly, the examples illustrated in FIGS. 4–9 do not specify direction of rotation, successful operation in both directions being possible.

FIG. 4 shows chamfer tool 10 engaging a workpiece W, as during chamfering. A first advantage of bullet nose 14 is seen in that holder 12 is able to penetrate workpiece W, thereby being able to work at close quarters, even though holder radial diameter 48 is such that a similar chamfering operation would be impossible were holder 12 cylindrical. Cutting edge 38 engages an internal surface S of workpiece W and faces forwardly in this position, in that it is located on a side of bullet nose 14 opposite shank 16.

In FIG. 5, cutting element 24 has been repositioned to extend further outside holder 12. This is another example of a forwardly facing, internal chamfering operation. Greater diameter of workpiece W, compared to that of FIG. 4, is accommodated by this repositioning, and holder 12 need not be moved axially within its machine tool (not shown).

FIG. 6 illustrates an internal chamfering operation. Internal chamfering is accomplished by moving holder 12 forwardly, as indicated by arrow 50, and then upwardly, indicated by arrow 52.

It is further possible that there will occur occasions upon which chamfer tool 10 is usable in the same configuration as previously employed for another chamfering operation, As an example, the operation of FIG. 6 might be performed with chamfer tool 10 set up as in the example of FIG. 4. Obviously, this saves labor of adjustment.

Spreading wear evenly along cutting edge 38 is illustrated with reference to FIGS. 7 and 8. In FIG. 7, a forwardly facing, internal end chamfering operation causes wear to the right hand portion of cutting edge 38. However, in FIG. 8, cutting element 24 has been advanced in the direction shown by arrow 54, and holder 12 has been withdrawn in the direction indicated by arrow 56. In the new position of FIG. 8, wear now occurs at the left portion of cutting edge 38. A second application of the same adjustment is seen in sharpening cutting element 24 during a chamfering operation. Since grinding will slightly alter dimensions of cutting element 24, the two above adjustments will enable chamfering to resume after interruption with minimal loss of time to reset chamfer tool 10 to accommodate its new dimensions. Setscrew 28 is slackened, enabling withdrawing of cutting element 24 while leaving holder 12 secure in the machine tool.

Figure 9:
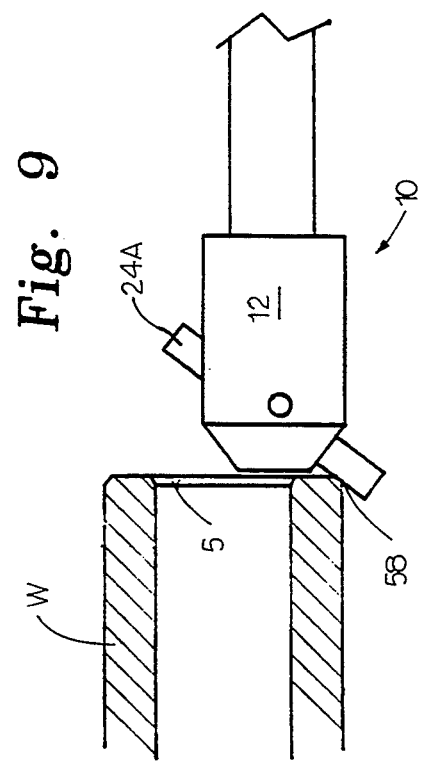
Figure 10:
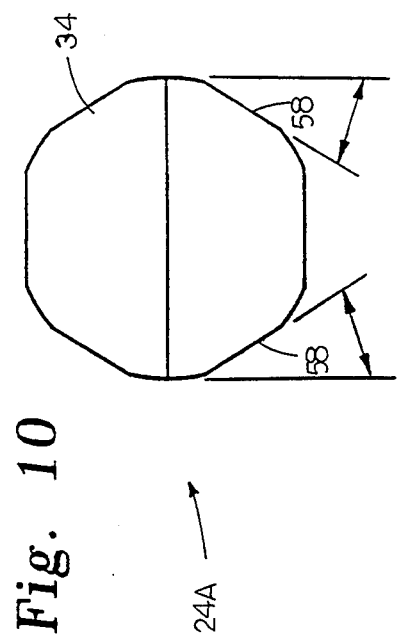
FIG. 10 is a front elevational view of an alternative embodiment cutting element.

As shown in FIG. 9, external chamfering is performed, employing a specially manufactured, or custom modified cutting element 24A. As illustrated in FIG. 10, a flat 58 is machined into body 34, thus enabling cutting at a new location compared to cutting element 24. Chamfering is performed in normal fashion.

Figure 12:
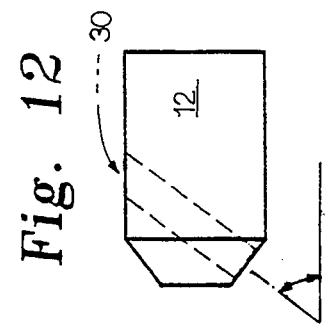
Figure 13:
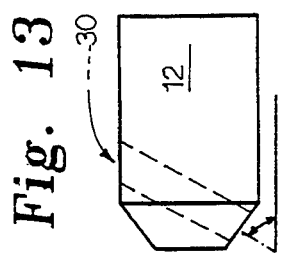

Offset bore 30 is drilled into holder 12 to any desired angle. FIGS. 11–13 illustrate holders 12,12,12, respectively, drilled to provide standard industry included angles of 60 degrees, 82 degrees, and 90 degrees, respectively.

A further advantage of the novel arrangement of cutting element 24 is shown in FIG. 14. With cutting edge 38 lying in a plane bisecting body 34, a recess 60 is defined thereby. Recess 60 allows escape of cuttings C and access of cutting or lubricating fluids F to a point of contact between cutting edge 38 and workpiece W.

Arrangement of cutting element 24 also enables ready sharpening. A standard grinding wheel G, and not special grinding equipment, is used, as shown in FIG. 15, to grind face 42. Face 40 need not be ground. Thus, coordinated grinding of cooperating faces, as required in much of the prior art, is obviated, and a worker of limited skill is still able to sharpen the novel cutting element 24 effectively.

The novel chamfering tool 10 is easily machined in various configurations. These configurations include different shank diameters and lengths, and offset bore 30 employs the same cutting element 24 to utilize industry standard 60 degree, 82 degree, and 90 degree chamfering included angles.

It is to be understood that the present invention is not limited to the embodiments described above, but encompasses any and all embodiments within the scope of the following claims.

I claim:

1. An angular offset chamfer tool comprising:
   an elongated holder including a bullet nose having a tapered surface, an outer lateral surface, and means defining an angularly offset bore penetrating and exiting said holder through said bullet nose tapered surface; and
   a cutting element having an elongated body corresponding in cross section to said angularly offset bore so as to be retained therein in a close fit, said cutting element including a cutter longitudinal axis, proximal and distal ends, and first and second working heads located at said proximal and distal ends respectively, each of said first and second working heads having first and second faces, said first face of said first working head being in a plane including said cutter longitudinal axis, said second face of said first working head intersecting said first face of said first working head along a line perpendicular to said cutter longitudinal axis to form a first cutting edge, said first face of said second working head being in a plane including said cutter longitudinal axis, and said second face of said second working head intersecting said first face of said second working head along a line perpendicular to said cutter longitudinal axis to form a second cutting edge, whereby said cutting element is removably insertable in said offset bore so as to extend outwardly through at said bullet nose tapered surface.

2. The angular offset chamfer tool according to claim 1, wherein said cutting element respective second faces are parallel.

3. The angular offset chamfer tool according to claim 1 wherein said offset bore exits said holder through said bullet nose tapered surface and through said outer lateral surface, whereby said cutting element is selectively positioned therewithin to exit from said holder at said bullet nose tapered surface and at said outer lateral surface along said offset bore.

4. The angular offset chamfer tool according to claim 1, said elongated holder further including cutting element retention means comprising:
   means defining a threaded locking bore intersecting said offset bore; and
   setscrew means for being threaded into said locking bore, thereby bearing against and securing said cutting element.

5. The angular offset chamfer tool according to claim 1, said elongated holder including shank means, whereby said chamfer tool is held in a machine tool, so as to engage a workpiece.

6. An angular offset chamfer tool comprising:
   an elongated holder including a bullet nose having a tapered surface, an outer lateral surface, and means defining an angularly offset bore penetrating and exiting said holder through said bullet nose tapered surface; and
   a cutting element having an elongated body corresponding in cross section to said angularly offset bore so as to be retained therein in a close fit, said cutting element including a cutter longitudinal axis, proximal and distal ends, and at least one working head located at one of said proximal and distal ends, said working head including a first face and a second face, said first face being in a plane including said cutter longitudinal axis, said second face intersecting said first face along a line perpendicular to said cutter longitudinal axis to form a cutting edge, and said second face forming an angle of about ten degrees with a reference plane containing said cutting edge and being perpendicular to said first face, whereby said cutting element is removably insertable in said offset bore so as to extend outwardly through at said bullet nose tapered surface.

* * * * *